US012172618B2

(12) United States Patent
Takeda

(10) Patent No.: US 12,172,618 B2
(45) Date of Patent: Dec. 24, 2024

(54) BRAKING CONTROL APPARATUS

(71) Applicant: SUBARU CORPORATION, Tokyo (JP)

(72) Inventor: Takashi Takeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 203 days.

(21) Appl. No.: 17/870,168

(22) Filed: Jul. 21, 2022

(65) Prior Publication Data

US 2023/0033946 A1 Feb. 2, 2023

(30) Foreign Application Priority Data

Jul. 30, 2021 (JP) .................. 2021-125196

(51) Int. Cl.
*B60T 7/22* (2006.01)
*B60T 8/172* (2006.01)

(52) U.S. Cl.
CPC ................ *B60T 7/22* (2013.01); *B60T 8/172* (2013.01); *B60T 2201/024* (2013.01); *B60T 2201/12* (2013.01)

(58) Field of Classification Search
None
See application file for complete search history.

(56) References Cited

U.S. PATENT DOCUMENTS

| 9,789,858 | B1* | 10/2017 | Parikh | B60T 7/22 |
| 10,672,270 | B2* | 6/2020 | Kim | G08G 1/096716 |
| 11,433,861 | B2* | 9/2022 | Kakeshita | B60W 30/18027 |
| 2013/0173113 | A1* | 7/2013 | Takiguchi | B60W 50/10 |
| | | | | 701/36 |
| 2016/0194000 | A1* | 7/2016 | Taki | B60W 30/08 |
| | | | | 701/70 |
| 2021/0323574 | A1* | 10/2021 | Yoo | G08G 1/166 |
| 2022/0289179 | A1* | 9/2022 | Thomas | B60W 60/0027 |
| 2022/0314972 | A1* | 10/2022 | Hashimoto | B60W 30/095 |
| 2022/0314973 | A1* | 10/2022 | Aimura | B60W 30/09 |

FOREIGN PATENT DOCUMENTS

| JP | 2003-081074 A | 3/2003 |
| JP | 2005-225447 A | 8/2005 |

\* cited by examiner

*Primary Examiner* — Hunter B Lonsberry
*Assistant Examiner* — Robert L Pinkerton
(74) *Attorney, Agent, or Firm* — Rimon P.C.

(57) ABSTRACT

A braking control apparatus includes a contact determiner and a collision brake processor. The contact determiner is configured to determine whether a collision determination on a contact of a vehicle is satisfied. The collision brake processor is configured to cause a brake device of the vehicle to generate a braking force to achieve a predetermined deceleration rate of the vehicle if the contact determination is satisfied. The collision brake processor is configured to, upon determining that the brake device is in a predetermined pre-contact braking state immediately before the contact determination is satisfied, set a deceleration rate of the vehicle after the contact determination is satisfied to a value larger than in a case where the collision brake processor does not determine that the brake device is in the predetermined pre-contact braking state.

8 Claims, 4 Drawing Sheets

BRAKING CONTROL APPARATUS

CROSS-REFERENCE TO RELATED APPLICATIONS

The present application claims priority from Japanese Patent Application No. 2021-125196 filed on Jul. 30, 2021, the entire contents of which are hereby incorporated by reference.

BACKGROUND

The technology relates to a braking control apparatus that controls a brake device of a vehicle.

For example, some of brake devices to be provided in vehicles such as automobiles are known to have a brake assist function of generating, upon an emergency, a larger braking force relative to an operation amount (an operation force) of a brake pedal than upon a normal situation.

As a technique related to the brake assist, for example, Japanese Unexamined Patent Application Publication (JP-A) No. 2005-225447 discloses a braking apparatus for a vehicle having a brake assist function. The braking apparatus disclosed in JP-A No. 2005-225447 performs a so-called pre-crash brake assist control on the basis of data including a distance and a relative speed between an own vehicle and an object ahead of the own vehicle. The pre-crash brake assist control produces a braking state in which the brake assist intervenes, irrespective of the presence of an urgent brake pedal operation performed a driver who drives the own vehicle.

Further, a collision brake function (CBC) is known that causes a braking force to automatically occur to decelerate an own vehicle in a case where the driver fails to operate the own vehicle after an occurrence of a collision. This reduces secondary damage to the own vehicle and its surroundings upon the occurrence of the collision.

As a technique related to the collision brake, for example, JP-A No. 2003-081074 discloses controlling a braking force of the collision brake on the basis of a surrounding traffic condition (e.g., a possibility of a secondary collision) in a case where it is detected that an own vehicle is hit by another vehicle.

SUMMARY

An aspect of the technology provides a braking control apparatus to be applied to a vehicle. The braking control apparatus includes a contact determiner and a collision brake processor. The contact determiner is configured to determine whether a collision determination on a contact of the vehicle is satisfied. The collision brake processor is configured to cause a brake device of the vehicle to generate a braking force to achieve a predetermined deceleration rate of the vehicle in a case where the contact determination is satisfied. The collision brake processor is configured to determine whether the brake device is in a predetermined pre-contact braking state immediately before the contact determination is satisfied. The collision brake processor is configured to, in response to determining that the brake device is not in the predetermined pre-contact braking state immediately before the contact determination is satisfied, set a deceleration rate of the vehicle after the contact determination is satisfied to a first value. The collision brake processor is configured to, in response to determining that the brake device is in the predetermined pre-contact braking state immediately before the contact determination is satisfied, set the deceleration rate of the vehicle after the contact determination is satisfied to a second value larger than the first value.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
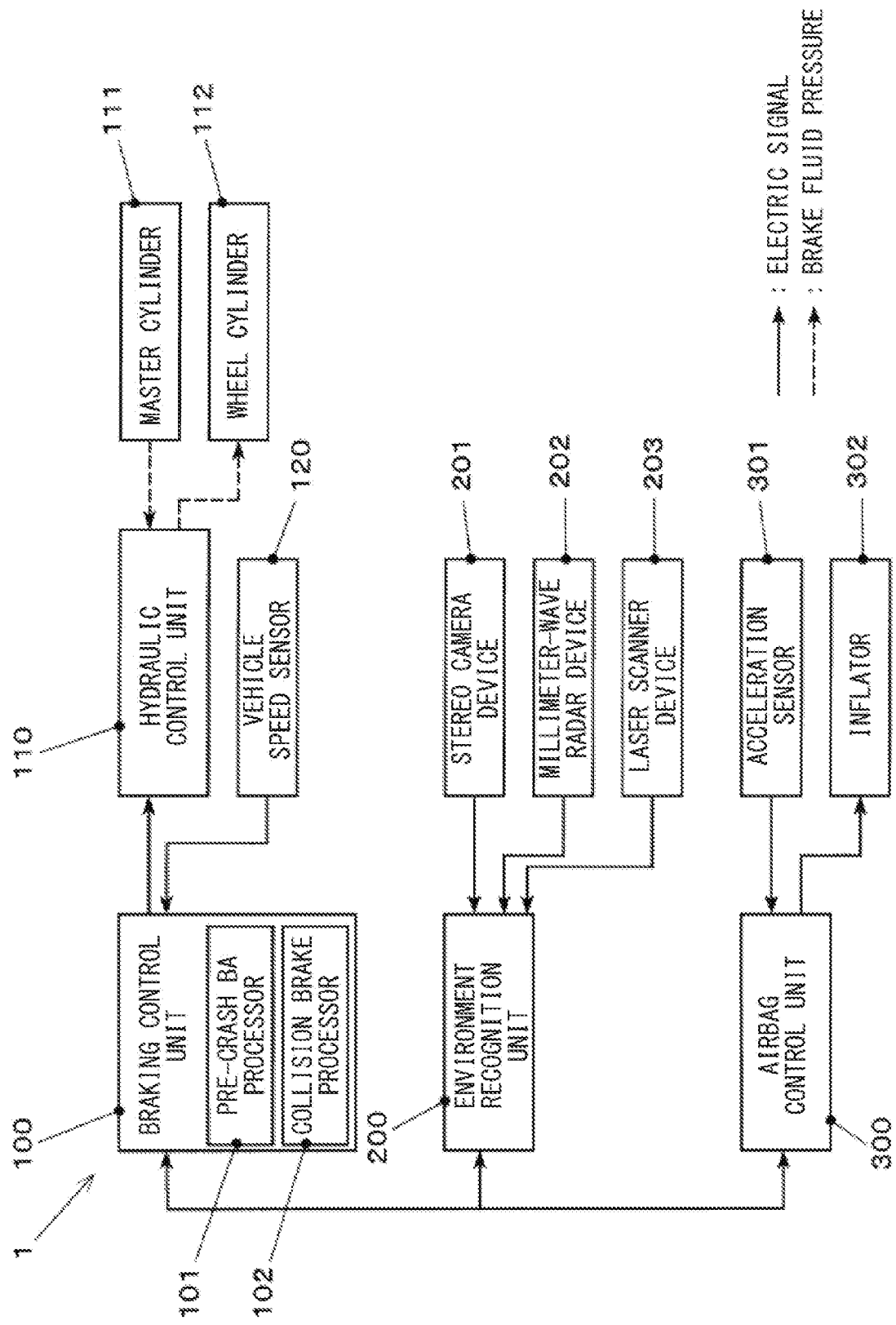
FIG. 1 is a diagram schematically illustrating an example of a configuration of a braking control apparatus according to one example embodiment of the technology.

From a viewpoint of reducing secondary damage resulting from a collision, a deceleration rate to be achieved during operation of a collision brake may be set to a level that is high enough to, for example, cause an anti-lock brake system (ABS) to operate (e.g., about 0.8 G to about 1 G on a dry paved road) to thereby decelerate the vehicle rapidly.

However, this may give rise to a concern that in the event of malfunction of the collision brake, the vehicle can undergo abrupt deceleration unintended by the driver, and a following vehicle can thus be forced to perform emergency braking to avoid a collision.

Accordingly, the deceleration rate to be achieved by the collision brake may typically be set to a slightly higher level (e.g., about 0.4 G) than that of a normal deceleration rate.

Meanwhile, immediately before an occurrence of a collision, the vehicle is expected to undergo a rapid deceleration with a deceleration rate of, for example, about 0.8 G to about 1 G in many cases by any of brake functions including, for example, a collision-damage-reducing brake (a pre-crash brake) and a pre-crash brake assist. The pre-crash brake may use sensors including a stereo camera and a millimeter-wave radar, for example. The pre-crash brake assist generates a large braking force relative to a braking operation performed by the driver in a case where there is concern about a possibility of a collision with a risk object.

In a case where a vehicle comes into collision from, for example, a rapidly decelerated state under the pre-crash brake assist control and the collision brake thus comes into operation, performing control to achieve a relatively low deceleration rate that is employable in normal collision braking can result in a braking loss, that is, a deceleration rate after the collision being lower than that immediately before the collision. This can degrade the effect of reducing secondary damage.

It is desirable to provide a braking control apparatus that makes it possible to achieve an improved effect of reducing secondary damage resulting from a collision and to secure safety against malfunction.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

First Example Embodiment

A description is given below of a braking control apparatus according to a first example embodiment of the technology.

The braking control apparatus according to any of the following example embodiments of the technology, including the first example embodiment, may be configured to be mounted on a vehicle such as an automobile, including a passenger car.

The braking control apparatus according to the first example embodiment may perform a collision brake control, or a brake control for a reduction in secondary damage resulting from a collision. The collision brake control executes braking automatically and thereby decelerates or stops an own vehicle in a case where the own vehicle collides with an object such as another vehicle.

FIG. 1 is a block diagram schematically illustrating an example of a configuration of the braking control apparatus according to the first example embodiment.

The braking control apparatus 1 according to the first example embodiment may include a braking control unit 100, a hydraulic control unit 110, an environment recognition unit 200, and an airbag control unit 300.

The braking control unit 100, the hydraulic control unit 110, the environment recognition unit 200, and the airbag control unit 300 may each be or each include a microcomputer having devices including, for example, a data processor, a storage, an input/output interface, and a bus. The data processor may be a central processing unit (CPU). The storage may be any memory such as a random-access memory (RAM) or a read-only memory (ROM). The bus may couple the data processor, the storage, and the input/output interface together.

The braking control unit 100, the hydraulic control unit 110, the environment recognition unit 200, and the airbag control unit 300 may each transmit various pieces of data via an in-vehicle local area network (LAN) such as a controller area network (CAN) communication system, or may each communicate directly with each other to transmit the various pieces of data.

The braking control unit 100 may control an unillustrated fluid-pressure-based service brake, or a brake device, provided for each wheel of the vehicle.

The braking control unit 100 may give a command to the hydraulic control unit 110 to individually control a brake fluid pressure of a wheel cylinder 112 of each wheel and to thereby cause the service brake of each wheel to generate a desired braking force.

The braking control unit 100 may be coupled to devices including, for example, a vehicle speed sensor 120.

The vehicle speed sensor 120 may detect a rotation speed, or a wheel speed, of a corresponding wheel.

The braking control unit 100 may perform known controls including, for example, an anti-lock brake control and an attitude stabilization control.

The anti-lock brake control may recover a rotation of a wheel by decreasing the brake fluid pressure of the corresponding wheel in a case where a wheel lock occurs during braking.

The attitude stabilization control may generate a difference in braking force between right and left wheels upon the occurrence of an oversteer behavior or an understeer behavior of the vehicle, and may thereby generate a yaw moment in a direction of suppressing the behavior.

The braking control unit 100 may include processors including, for example, a pre-crash brake assist (BA) processor 101 and a collision brake processor 102.

The pre-crash brake assist processor 101 may perform a pre-crash brake assist control in a case where a brake fluid pressure of a master cylinder 111 is increased by a brake operation by the driver while the environment recognition unit 200 recognizes a risk object ahead of the own vehicle. The pre-crash brake assist control may increase the brake fluid pressure of the wheel cylinder 112, relative to that in a normal situation, to a level enough to cause the anti-lock brake control to intervene (e.g., about 0.8 G to about 1 G in deceleration rate).

The collision brake processor 102 may perform a collision brake control that generates a braking force to achieve a predetermined deceleration rate of the vehicle in a case where the airbag control unit 300 detects an occurrence of a collision and determines to expand an airbag. The collision brake control may supply a fluid pressure to the wheel cylinder 112 to generate the braking force and thereby decelerate the vehicle. In one embodiment, the collision brake processor 102 may serve as a "collision brake processor".

A target deceleration rate in the collision brake control may be set, for example, to a value that is often employed upon normal traveling of a vehicle, or to a value slightly larger than such a normal deceleration rate, e.g., to about 0.4 G. This is to prevent the vehicle from undergoing abrupt deceleration in the event of malfunction of the collision brake.

Further, the target deceleration rate in the collision brake control is set to a value larger than that in a normal situation in a case where a predetermined pre-collision braking state is determined immediately before satisfaction of a determination as to whether the airbag is to be expanded, that is, immediately before satisfaction of a collision determination. This will be described in detail later.

The hydraulic control unit 110 may individually adjust the brake fluid pressure of the wheel cylinder 112 of each wheel.

The hydraulic control unit 110 may include an electric pump that increases a pressure of a brake fluid. The hydraulic control unit 110 may also include valves that control the brake fluid pressure of each wheel cylinder 112, including, for example, a pressure-increasing valve, a pressure-decreasing valve, and a pressure holding valve.

The hydraulic control unit 110 may be coupled to devices including, for example, the master cylinder 111 and the wheel cylinder 112, via a brake fluid pipe filled with the brake fluid.

The master cylinder 111 may increase the pressure of the brake fluid in response to an operation of an unillustrated brake pedal performed by a driver.

The brake fluid pressure generated by the master cylinder 111 may be configured to be transmitted to the wheel cylinder 112 through the hydraulic control unit 110.

The hydraulic control unit 110 may detect the brake fluid pressure of the master cylinder 111. On the basis of the brake fluid pressure, the hydraulic control unit 110 detects a braking operation by the driver. In one embodiment, the hydraulic control unit 110 may serve as a "braking operation detector".

The hydraulic control unit 110 may perform an override of the brake fluid pressure generated by the master cylinder 111 to increase or decrease the brake fluid pressure of each wheel cylinder 112.

The wheel cylinder 112 may be provided for each wheel, and may generate friction force, or the braking force, that corresponds to the brake fluid pressure, by pressing a brake pad against a disc rotor, for example.

The environment recognition unit 200 may recognize an environment, including an object and a road shape, around an own vehicle.

The environment recognition unit 200 may recognize a risk object having a possibility of collision with the own vehicle higher than or equal to a predetermined level. In one embodiment, the environment recognition unit 200 may serve as a "risk object recognizer".

The environment recognition unit 200 may be coupled to at least one of various sensors that are each able to detect a risk object. Such sensors include, for example, a stereo camera device 201, a millimeter-wave radar device 202, and a laser scanner device 203. FIG. 1 illustrates an example configuration in which the environment recognition unit 200 may be provided with all of the stereo camera device 201, the millimeter-wave radar device 202, and the laser scanner device 203. However, this is non-limiting, and the environment recognition unit 200 may be provided with one or more, but not all, of these sensors. Alternatively, the environment recognition unit 200 may be provided with other kind of sensors.

The stereo camera device 201 may include paired cameras disposed at a predetermined distance, or a predetermined baseline length, from each other. The stereo camera device 201 may recognize an object such as another vehicle, a pedestrian, or a bicycle rider, and may also detect a relative position of the object with respect to an own vehicle by performing known image processing.

The millimeter-wave radar device 202 may be a radar device that uses radio waves in a frequency band of, for example, 30 to 300 GHz. The millimeter-wave radar device 202 may detect the presence or absence of an object and the relative position of the object with respect to the own vehicle.

The laser scanner device, or laser imaging detection and ranging (LiDAR) device 203 may irradiate the surroundings of the own vehicle with, for example, pulsed near-infrared laser light to scan the surroundings and to thereby detect information including, for example, the presence or absence of an object, the relative position of the object with respect to the own vehicle, and the shape of the object on the basis of the presence or absence of reflected light and a time difference between emission of the laser light and returning of reflected light.

The airbag control unit 300 may control expansion of the airbag. The airbag may be provided in a vehicle compartment of a vehicle, and may restrain an occupant upon a collision.

For example, the airbag may have a base fabric that includes nylon fibers, and may be in a bag shape. The airbag may expand and inflate as a result of introduction of an expansion gas upon a collision, and may thereby restrain the occupant, for example.

The airbag control unit 300 may be coupled to devices including, for example, an acceleration sensor 301 and an inflator 302.

The acceleration sensor 301 may be provided at each of multiple locations of the vehicle body, and may detect acceleration that acts on the vehicle body upon the collision.

If the acceleration sensor 301 detects an acceleration of a predetermined value or above, the airbag control unit 300 may determine a collision, and may give a command to the inflator 302.

In one embodiment, the airbag control unit 300 may serve as a "collision determiner" or a "contact determiner".

The inflator 302 may be a gas generator that supplies the expansion gas to each airbag provided in the vehicle, in response to the command given from the airbag control unit 300.

Next, a description is given of a braking control to be performed, upon a collision, by the braking control apparatus according to the first example embodiment.

Figure 2:
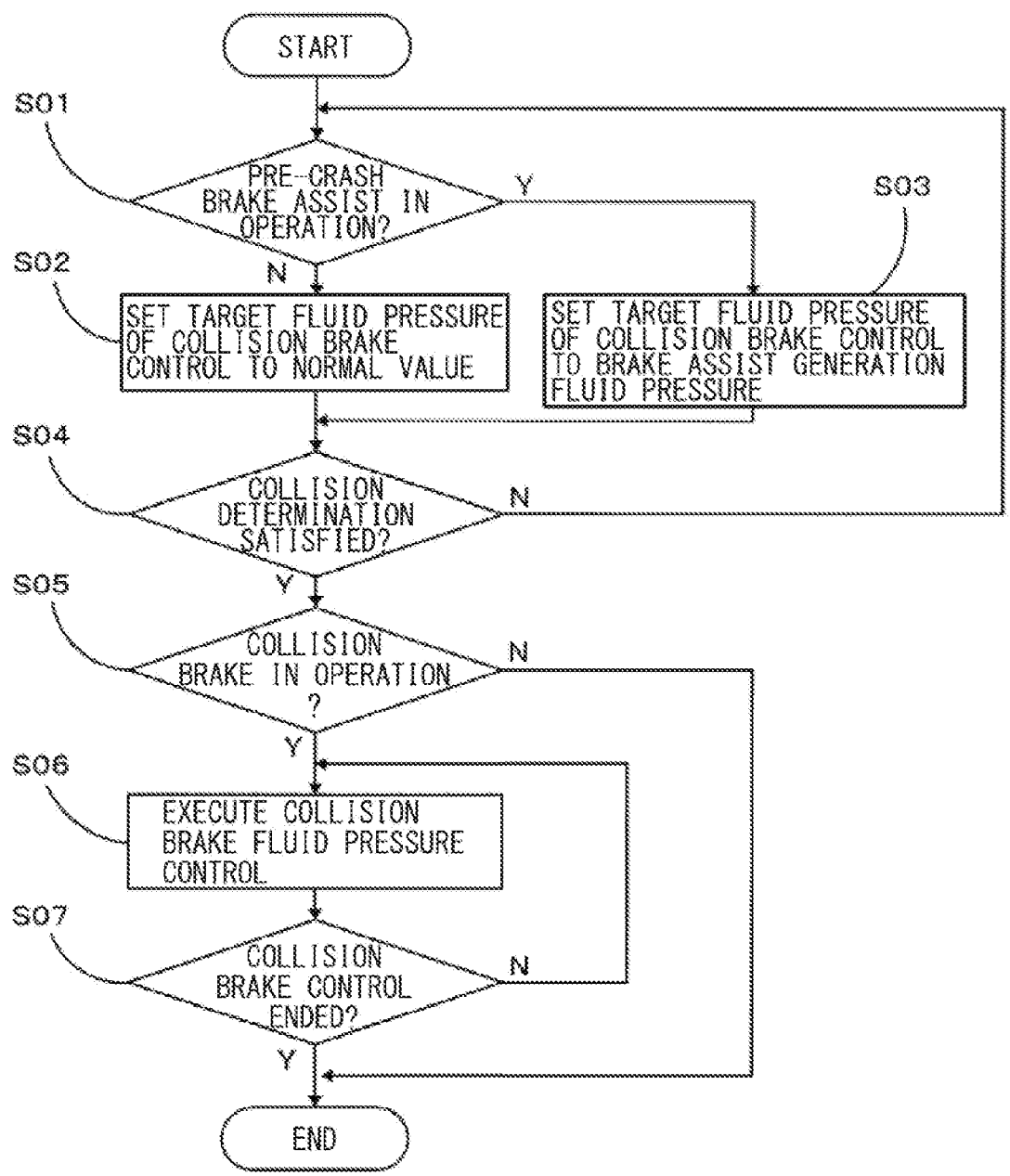
FIG. 2 is a flowchart illustrating an example of an operation, upon a collision, of the braking control apparatus according to one example embodiment of the technology.

FIG. 2 is a flowchart illustrating an example of an operation upon a collision of the braking control apparatus according to the first example embodiment.

In the following, the description is given in the order of steps.

[Step S01: Determination as to Whether Pre-Crash Brake Assist is in Operation]

The braking control unit 100 may determine whether a braking-force increase under the pre-crash brake assist control by the pre-crash brake assist processor 101 is executed, that is, whether the pre-crash brake assist control intervenes.

If the braking-force increase under the pre-crash brake assist control is executed (step S01: Y), the braking control unit 100 may cause the process to proceed to step S03, based on the assumption that a pre-collision braking state is achieved. Otherwise (step S01: N), the process may proceed to step S02.

[Step S02: Setting of Target Fluid Pressure of Collision Brake Control to Normal Value]

The collision brake processor 102 may set a control target fluid pressure of the wheel cylinder 112 where the collision brake control intervenes to a value for a normal situation that is set in advance.

The control target fluid pressure for a normal situation may be set, for example, to allow a deceleration rate of about 0.4 G to occur on the vehicle.

Thereafter, the operation may proceed to step S04.

[Step S03: Setting of Target Fluid Pressure of Collision Brake Control to Brake Assist Generation Fluid Pressure]

The collision brake processor 102 may set the control target fluid pressure of the wheel cylinder 112 where the collision brake control intervenes to a fluid pressure of the wheel cylinder 112 that is currently generated by the pre-crash brake assist control.

In this case, the deceleration rate of the vehicle reaches a level at which the anti-lock brake control intervenes (e.g., about 0.8 G to about 1 G).

Thereafter, the process may proceed to step S04.

[Step S04: Determination as to Whether Collision Determination is Satisfied]

The braking control unit 100 may determine whether a collision at a level that requires an expansion of the airbag is detected by the airbag control unit 300, that is, whether a collision determination is satisfied.

If the braking control unit 100 determines that the collision determination is satisfied (step S04: Y), the process may proceed to step 505. If the braking control unit 100 determines that the collision determination is not satisfied (step S04: N), the process may return to step S01, and the subsequent processes may be repeated.

[Step 505: Determination as to Whether Collision Brake is in Operation]

The braking control unit 100 may determine whether an intervention of the collision brake control by the collision brake processor 102 is present.

Even in a case where the collision determination is satisfied at the airbag control unit 300, no intervention of the collision brake control may result if a possibility of secondary damage resulting from the collision is low or if an erroneous determination by the airbag control unit 300 is suspected. Examples of such a situation include where the vehicle speed is low, where a braking operation that generates a braking force of a predetermined level or higher is performed by the driver, and where the acceleration of the vehicle body upon the collision is at a predetermined value or lower.

If the braking control unit 100 determines that the intervention of the collision brake control is present, that is, the collision brake is in operation (step S05: Y), the process may proceed to step S06. If the braking control unit 100 determines that the intervention of the collision brake control is absent, that is, the collision brake is not in operation (step S05: N), a series of processes may end.

[Step S06: Execution of Collision Brake Fluid Pressure Control]

The braking control unit 100 or the collision brake processor 102 may give a command to the hydraulic control unit 110 and execute a feedback control to cause a fluid pressure of the wheel cylinder 112 during the collision brake control to reach the control target fluid pressure that is set in step S02 or step S03.

Thereafter, the process may proceed to step S07.

[Step S07: Determination as to Whether Collision Brake Control is Ended]

The braking control unit 100 or the collision brake processor 102 may determine whether the collision brake control is ended.

The collision brake control may be ended, for example, in a case where the vehicle speed of the vehicle is reduced to a predetermined value set in advance or where there is an override by an accelerator operation or a brake operation by the driver.

If the braking control unit 100 or the collision brake processor 102 determines that the collision brake control is ended (step S07: Y), the series of processes may end or may be returned. Otherwise (step S07: N), the process may return to S06, and the subsequent processes may be repeated.

The first example embodiment described above makes it possible to achieve at least one of the following example effects.

(1) In a case where it is determined that the pre-crash brake assist control is in operation (i.e., the pre-collision braking state is achieved) immediately before satisfaction of the collision determination, the fluid pressure of the wheel cylinder 112 after satisfaction of the collision determination may be raised to thereby increase the deceleration rate of the vehicle relative to a case where the pre-crash brake assist control is not in operation. This makes it possible to increase the effect of reducing secondary damage in a case where the vehicle comes into collision from the pre-collision braking state.

For example, in a case where the deceleration rate is increased from 0.4 G to 1 G, it is possible for a braking distance required for decelerating the vehicle from 120 km/h to 20 km/m to be reduced from 350 m to 140 m.

The deceleration rate to be generated by the collision brake processor 102 in a state where the pre-crash brake assist control is not in operation or where it is not determinable whether the pre-crash brake assist control is in operation may be reduced relative to that in a state where the pre-crash brake assist control is in operation. This makes it possible to prevent the vehicle from undergoing abrupt deceleration by unintentional generation of a braking force in the event of malfunction of the collision brake processor 102.

(2) The collision brake processor 102 may set the fluid pressure of the wheel cylinder 112 and the deceleration rate of the vehicle after the satisfaction of the collision determination, in a case of determining that the pre-crash brake assist control is in operation, to values equivalent to those under the pre-crash brake assist control. This avoids reductions in braking force and deceleration rate after the collision, making it possible to ensure the effect of reducing secondary damage and to prevent the user from having the impression that the braking force is lost and thus feeling anxiety.

(3) The pre-collision braking state may be determined upon operation of the pre-crash brake assist control, and then the fluid pressure of the wheel cylinder 112 and the deceleration rate of the vehicle in the collision brake control may be increased relative to those in a normal situation. This makes it possible for the collision brake control to reflect a state where there is a high possibility of occurrence of a collision. Accordingly, it is possible to appropriately achieve the above-described effects.

Furthermore, a determination made by the environment recognition unit 200 on the vehicle side and a determination made by a driver who has performed a brake operation may both be reflected in the determination of the pre-collision braking state. This makes it possible to reduce a possibility of occurrence of an erroneous determination.

Second Example Embodiment

A description is given next of a braking control apparatus according to a second example embodiment of the technology.

In the second example embodiment below and a third example embodiment to be described later, portions similar to those in the foregoing first example embodiment are denoted with the same reference numerals to avoid repetitive description, and differences will mainly be described.

Figure 3:
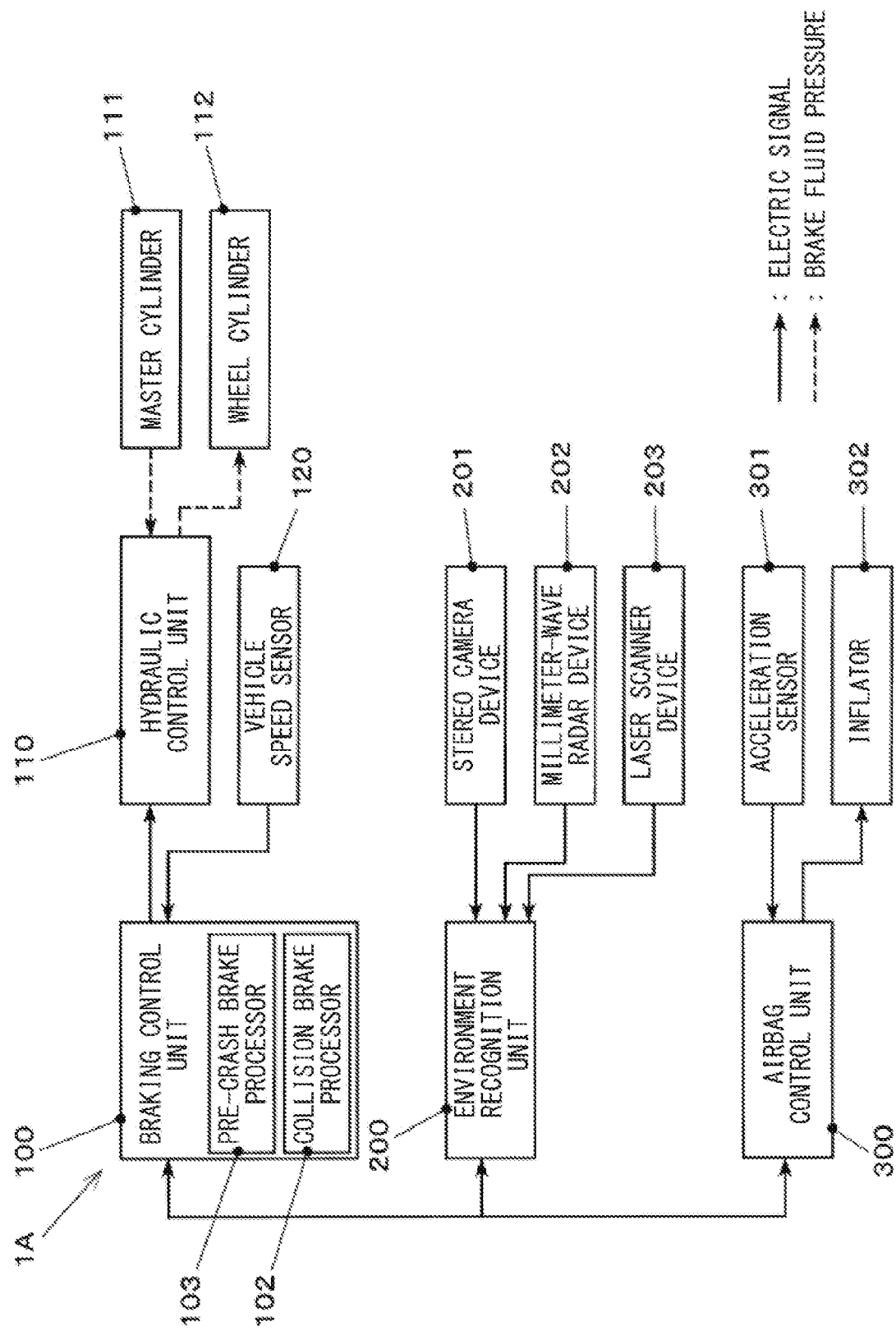
FIG. 3 is a diagram schematically illustrating an example of a configuration of the braking control apparatus according to one example embodiment of the technology.

FIG. 3 is a block diagram schematically illustrating an example of a configuration of the braking control apparatus according to the second example embodiment.

The braking control apparatus 1A according to the second example embodiment may include a pre-crash brake processor 103 in place of the pre-crash bake assist processor 101 of the braking control unit 100 of the first example embodiment.

The pre-crash brake processor 103 may perform a pre-crash brake control in a case where the environment recognition unit 200 recognizes a risk object having a high possibility of collision with an own vehicle ahead of the own vehicle. The pre-crash brake control may increase the brake fluid pressure of the wheel cylinder 112 to generate a braking force irrespective of the presence of a brake operation by the driver, that is, irrespective of a fluid pressure of the master cylinder 111.

The fluid pressure of the wheel cylinder 112 and the deceleration rate of the vehicle in the pre-crash brake control may each be set, in a case where the possibility of collision is high, to a level high enough to cause the anti-lock brake control to intervene, for example.

In the second example embodiment, upon operation of the pre-crash brake control, a control similar to that in the foregoing first example embodiment may be performed based on an assumption that the pre-collision braking state is achieved.

In this case, the fluid pressure of the wheel cylinder 112 and the deceleration rate of the vehicle in the collision brake control may be set to values equivalent to those in the pre-crash brake assist control.

The second example embodiment described above also makes it possible to achieve effects similar to those of the foregoing first example embodiment, excluding the example effect described in the last paragraph of (3).

Third Example Embodiment

A description is given next of a braking control apparatus according to a third example embodiment of the technology.

Figure 4:
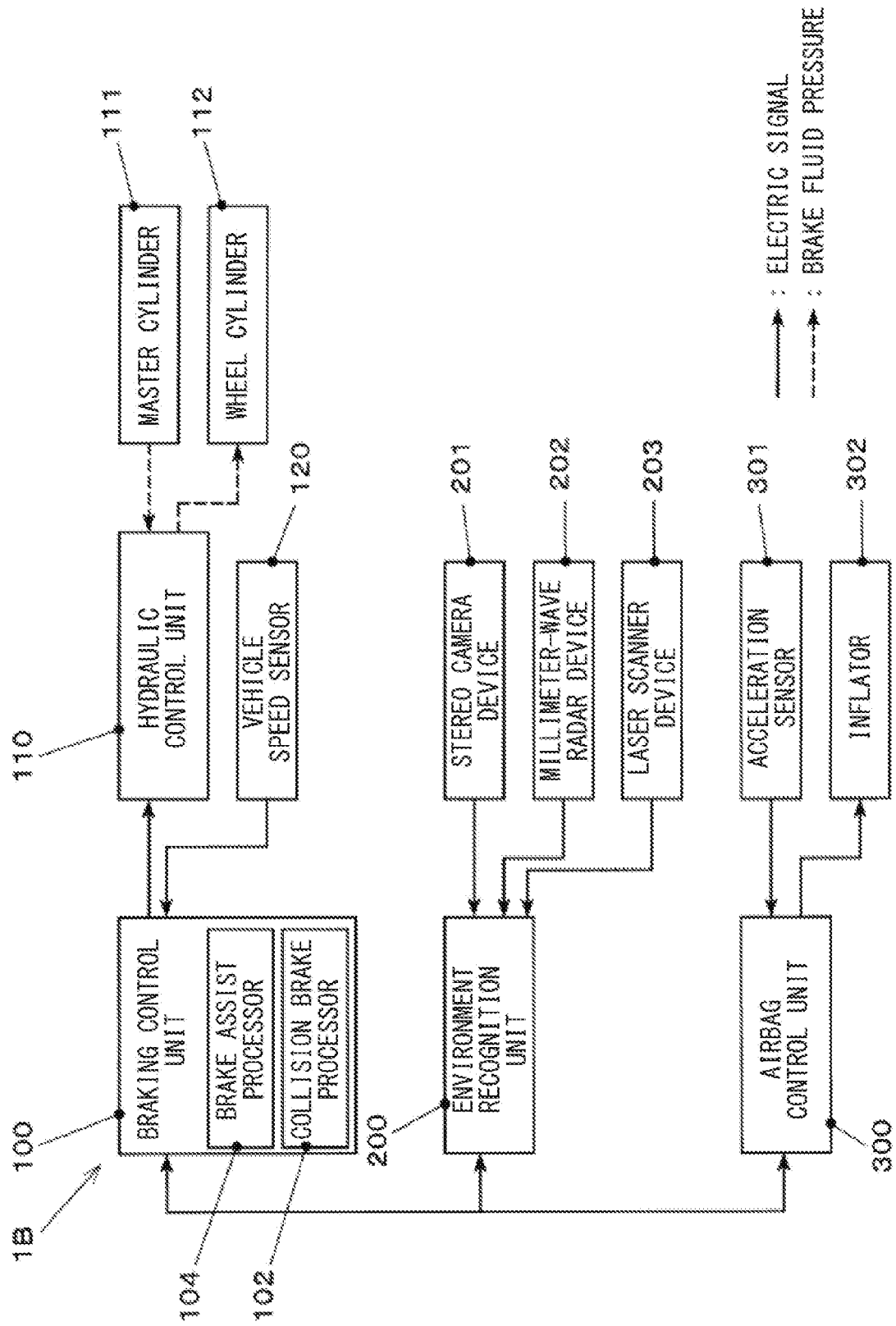
FIG. 4 is a diagram schematically illustrating an example of a configuration of the braking control apparatus according to one example embodiment of the technology.

FIG. 4 is a block diagram schematically illustrating an example of a configuration of the braking control apparatus according to the third example embodiment.

The braking control apparatus 1B according to the third example embodiment may include a brake assist processor 104 in place of the pre-crash bake assist processor 101 of the braking control unit 100 of the first example embodiment.

The brake assist processor 104 may perform a brake assist control in a case where the fluid pressure of the master cylinder 111 increases at a predetermined increase rate or higher due to a brake operation by the driver, that is, in a case where a sudden braking operation is performed by the driver. The brake assist control may achieve a large braking force by providing the wheel cylinder 112 with a higher fluid pressure than a fluid pressure of the wheel cylinder 112 that is normally achievable in accordance with the corresponding fluid pressure of the master cylinder 111.

The fluid pressure of the wheel cylinder 112 and the deceleration rate of the vehicle in the collision brake control may each be set to a level high enough to cause the anti-lock brake control to intervene, for example.

In the third example embodiment, upon operation of the brake assist control, a control similar to that in the foregoing first example embodiment may be performed based on an assumption that the pre-collision braking state is achieved.

In this case, the fluid pressure of the wheel cylinder 112 and the deceleration rate of the vehicle in the collision brake control may be set to values equivalent to those in the brake assist control.

The third example embodiment described above also makes it possible to achieve effects similar to those of the foregoing first example embodiment, excluding the example effect described in the last paragraph of (3).

Modification Examples

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

(1) The configurations of the braking control apparatus, the brake device, the vehicle, and other elements should not be limited to those described in the foregoing example embodiments, and may be modified as appropriate.

For example, the braking control may be performed on the basis of the fluid-pressure-based service brake in the foregoing example embodiments; however, this is non-limiting. In some embodiments, any one or more of various braking-force generators (brake devices) and generation methods, including, for example, a regenerative brake that uses a motor generator, an electric brake that uses an electric actuator to drive a friction material, and downshifting with an automatic transmission, i.e., so-called engine braking, may be used either singly or in combination by cooperative control.

Furthermore, any vehicle type may be chosen for the vehicle without limitation.

(2) In the foregoing example embodiments, the deceleration rate generated in the pre-collision braking state and the target deceleration rate of the collision brake control may be made equivalent to each other upon a shift from the pre-collision braking state to the collision brake control; however, this is non-limiting. In some embodiments, the target deceleration rate of the collision brake control upon the shift from the pre-collision braking state may be changed as appropriate without falling at or below a target deceleration rate of the collision brake control in a normal situation.

For example, the target deceleration rate of the collision brake control upon the shift from the pre-collision braking state to the collision brake control may be changed with an increasing tendency or a decreasing tendency relative to the deceleration rate in the pre-collision braking state.

According to at least one embodiment of the technology, it is possible to provide a braking control apparatus that makes it possible to achieve an improved effect of reducing secondary damage resulting from a collision and to secure safety against malfunction.

As used herein, the term "collision" may be used interchangeably with the term "contact".

The airbag control unit 300 and the collision brake processor 102 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airbag control unit 300 and the collision brake processor 102. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airbag control unit 300 and the collision brake processor 102 illustrated in FIG. 1.

The invention claimed is:

1. A braking control apparatus to be applied to a vehicle, the braking control apparatus comprising:
 a contact determiner configured to determine that the vehicle collides with an object; and
 a brake control processor configured to:
  in response to detecting (1) brake operation by a driver of the vehicle to cause a brake device to generate a braking force and (2) the object with which the vehicle is likely to collide, perform a pre-crash brake assist control that increases the braking force generated based on the brake operation of the driver;
  in response to the contact determiner detecting that the vehicle collides with the object while the pre-crash brake assist control is not being performed, cause the brake device to decelerate the vehicle at a first deceleration rate; and
  in response to the contact determiner detecting that the vehicle collides with the object while the pre-crash brake assist control is being performed, cause the brake device to decelerate the vehicle at a second deceleration rate greater than the first deceleration rate.

2. The braking control apparatus according to claim 1, wherein the second deceleration rate is same as a deceleration rate for the pre-crash brake assist control.

3. The braking control apparatus according to claim 1, further comprising:
 a risk object recognizer configured to recognize the object, with which the vehicle is likely to collide, around the vehicle; and
 a braking operation detector configured to detect the braking operation by the driver of the vehicle,
 wherein the brake control processor comprises:
  a pre-crash brake assist processor configured to perform the pre-crash brake assist control; and
  a collision brake processor configured to:
   determine that the pre-crash brake assist control is being performed;
   in response to (1) the contact determiner detecting that the vehicle collides with the object and (2) an absence of the pre-crash brake assist control, cause the brake device to decelerate the vehicle at the first deceleration rate; and
   in response to (1) the contact determiner detecting that the vehicle collides with the object and (2) the pre-crash brake assist control being performed, cause the brake device to decelerate the vehicle at the second deceleration rate.

4. The braking control apparatus according to claim 2, further comprising:
 a risk object recognizer configured to recognize a risk the object, with which the vehicle is likely to collide, around the vehicle;
 a braking operation detector configured to detect the braking operation by the driver of the vehicle,
 wherein the brake control processor comprises:
  a pre-crash brake assist processor configured to perform the pre-crash brake assist control; and
  a collision brake processor configured to:
   determine that the pre-crash brake assist control is being performed;
   in response to (1) the contact determiner detecting that the vehicle collides with the object and (2) an absence of the pre-crash brake assist control, cause the brake device to decelerate the vehicle at the first deceleration rate; and
   in response to (1) the contact determiner detecting that the vehicle collides with the object and (2) the pre-crash brake assist control being performed, cause the brake device to decelerate the vehicle at the second deceleration rate.

5. The braking control apparatus according to claim 1, further comprising a risk object recognizer configured to recognize a risk the object, with which the vehicle is likely to collide, around the vehicle,
 wherein the brake control processor comprises:
  a pre-crash brake processor configured to perform the pre-crash brake assist control; and
  a collision brake processor configured to:
   determine that the pre-crash brake assist control is being performed;
   in response to (1) the contact determiner detecting that the vehicle collides with the object and (2) an absence of the pre-crash brake assist control, cause the brake device to decelerate the vehicle at the first deceleration rate; and
   in response to (1) the contact determiner detecting that the vehicle collides with the object and (2) the pre-crash brake assist control being performed, cause the brake device to decelerate the vehicle at the second deceleration rate.

6. The braking control apparatus according to claim 2, further comprising a risk object recognizer configured to recognize the object, with which the vehicle is likely to collide, around the vehicle,
 wherein the brake control processor comprises:
  a pre-crash brake processor configured to perform the pre-crash brake assist control; and
  a collision brake processor configured to:
   determine that the pre-crash brake assist control is being performed;
   in response to (1) the contact determiner detecting that the vehicle collides with the object and (2) an absence of the pre-crash brake assist control, cause the brake device to decelerate the vehicle at the first deceleration rate; and
   in response to (1) the contact determiner detecting that the vehicle collides with the object and (2) the pre-crash brake assist control being performed, cause the brake device to decelerate the vehicle at the second deceleration rate.

7. The braking control apparatus according to claim 1, further comprising a braking operation detector configured to detect the brake operation by the driver of the vehicle, and
 wherein the brake control processor comprises:
  a brake assist processor configured to perform the pre-crash brake assist control that increases the braking force of the brake device in response to the brake operation detector detecting the sudden braking operation; and
  a collision brake processor configured to:
   determine that the pre-crash brake assist control is being performed;
   in response to (1) the contact determiner detecting that the vehicle collides with the object and (2) an absence of the pre-crash brake assist control, cause the brake device to decelerate the vehicle at the first deceleration rate; and
   in response to (1) the contact determiner detecting that the vehicle collides with the object and (2) the pre-crash brake assist control being performed, cause the brake device to decelerate the vehicle at the second deceleration rate.

8. The braking control apparatus according to claim 2, further comprising a braking operation detector configured to detect the brake operation by the driver of the vehicle, and wherein the brake control processor comprises:
- a brake assist processor configured to perform the pre-crash brake assist control that increases the braking force of the brake device in response to the brake operation detector detecting the sudden braking operation; and
- a collision brake processor configured to:
  - determine that the pre-crash brake assist control is being performed;
  - in response to (1) the contact determiner detecting that the vehicle collides with the object and (2) an absence of the pre-crash brake assist control, cause the brake device to decelerate the vehicle at the first deceleration rate; and
  - in response to (1) the contact determiner detecting that the vehicle collides with the object and (2) the pre-crash brake assist control being performed, cause the brake device to decelerate the vehicle at the second deceleration rate.

* * * * *